April 13, 1954  S. P. WORDEN  2,674,887
GRAVITY METER
Filed Dec. 8, 1947

INVENTOR.
Samuel P. Worden
BY
E. V. Hardway
ATTORNEYS

Patented Apr. 13, 1954

2,674,887

UNITED STATES PATENT OFFICE 2,674,887

GRAVITY METER

Samuel P. Worden, Houston, Tex., assignor to Texas Instruments Incorporated, Dallas, Tex., a corporation of Delaware Application December 8, 1947, Serial No. 790,346

12 Claims. (Cl. 73—382)

This invention relates to a gravity meter.

While the invention herein described has been specifically shown as applied to a gravity meter the principle of the invention is also applicable to force measuring instruments, force controlling instruments, surveying instruments, geophysical instruments and other instruments which require compensating mechanism to neutralize temperature changes or other physical variations such as barometric or humidity fluctuations; however, the invention relates more specifically to gravity actuated instruments that are used in observing subsurface formations for the location of oil or other minerals.

An object of the invention is to provide an instrument of the character described which will accurately indicate changes in gravity and thereby ascertain the location of valuable subterranean mineral deposits; and while the instrument herein disclosed embodies certain principles commonly employed in meters in common use it also comprehends certain improvements which allows such meters to be operated and used without thermostatic control.

Another object of the invention is to provide an instrument of the character described which is of very simple construction and which, at the same time, will permit very delicate measurements and is smaller in size and of less weight and more rugged than conventional types of gravity meters now in use.

A further object of the invention is to provide an instrument of the character described embodying a compensating device which dispenses with the necessity of a thermostatic control.

A still further feature of the invention resides in the provision of an instrument of the character described which is of such construction and size that the working parts may be more efficiently insulated.

Other objects and advantages will be apparent from the following specification which is illustrated by the accompanying drawings, wherein.

Figure 1:
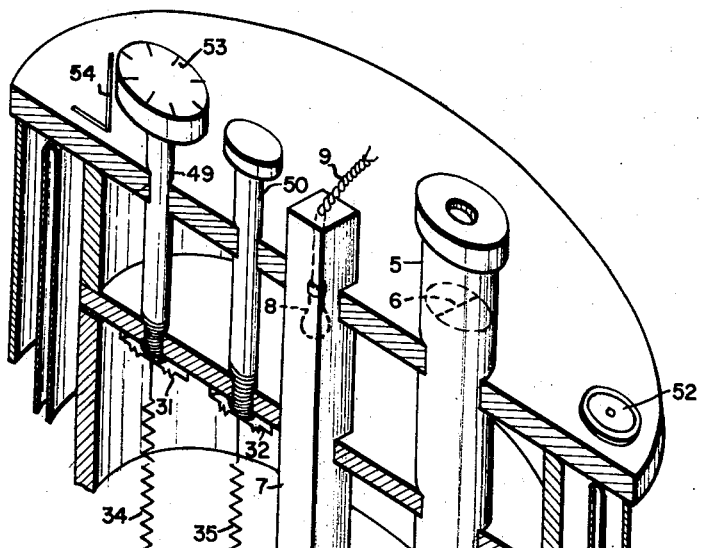
Figure 1 is an enlarged, fragmentary, vertical sectional view showing one form of the instrument in perspective.

Referring now more particularly to the drawings wherein like numerals of reference designate the same parts in each of the figures, the numeral 1 designates the outer housing of the instrument. The housing may be of any selected shape and composed of any suitable material.

Suspended within the housing from the top or lid thereof, there is an evacuated flask 2 which is spaced from the housing all the way around and is preferably formed throughout of double walls spaced apart and which serves to provide thermal insulation for the mechanism within the inner case 3. This inner case is within, and spaced from, the flask and is suspended from the lid or cover of the outer housing 1 by means of a tube 4 of thermal insulating material and also preferably filled with insulation.

The inner case 3 is preferably formed of metal having high thermal conductivity, such as copper, and this inner case should be hermetically sealed to exclude moisture and dust and to avoid variations in humidity, temperature and barometric pressure.

Mounted in the top or lid of the housing 1 and extended also through the top of, and into, the inner case 3 there is a microscope tube 5 provided with any selected number and kind of lenses as 5a, 5b. It also has a crosshair 6 at a selected location.

Also mounted in the top of the housing 1 there is a light tube 7 which extends on down through the top of, and into, the inner case 3. The lower end 7a of the tube 7 is turned horizontally with its free end upturned underneath the lower end of the microscope tube 5. The upper end of the light tube is closed and in said tube there is a source of light, preferably an electric light 8 connected with the electric wiring 9. The wiring may be connected with a battery, preferably carried by the instrument. Also within the light tube are reflectors such as 10 and 11 arranged so as to reflect the light through the upturned end of said tube.

The inclusion of the temperature compensating device, hereinafter more specifically described, dispenses with the necessity of a heavy storage type battery. This greatly reduces the size and weight of the instrument herein described, thus also rendering it more portable. Conventional gravity meters now commonly used weigh from fifty to seventy-five pounds whereas the meter embodying the present invention will weigh approximately five pounds.

Depending from the top of the inner case 3 there is a rod 12 having the lower overturned end 13 which extends horizontally when the instrument is in operative position and extending outwardly from said overturned end 13 there are the supporting rods 14 and 15 in parallel relationship and spaced apart. Upstanding from the rod 14 are the spaced arms 16, 16 and upstanding from the rod 15 are the spaced arms 17, 17. Rod 12 should be of material of low thermal expansion.

Between the upper ends of the arms 16 there is a spindle 18 whose ends are connected to the upper ends of the arms 16 by the pivots 19, 19. The spindle 18 may be mounted on the upstanding arms 16 in any other preferred manner so that it will freely rotate about its longitudinal axis.

Fixed to and upstanding from the spindle 18 there is a rod 20 whose upper end is overturned across the upturned end of the tube 7 thus forming a pointer 21 which co-operates with the cross hair 6 in a manner hereinafter stated.

Extending out horizontally from the spindle 18 there is an arm 22 whose free end carries a weight 23. The arm 22 works through a vertically elongated eye 24 formed on the outer end of the supporting rod 25 which, in turn, is fixed to the overturned end 13 of the rod 12.

Between the upper ends of the upstanding arms 17, 17 there is a spindle 26 whose ends may be connected to the upper ends of said arms by means of the torsion ties 27, 27. However, the spindle may be mounted on the arms 17 in any other preferred manner so as to rotate on a longitudinal axis. The spindles 18, 26 have the arms 28 and 29, respectively, fixed thereto and extending toward each other the former being located beneath the latter and the free ends of these arms are connected by means of the mass supporting spring 30. Secured to the underside of the top of the case 3 are the flexible anchors 31 and 32 and secured to one end of the spindle 26 there is a cross-arm 33. The anchor 31 is connected to one end of the cross-arm 33 by means of a relatively weak pull spring 34 and the anchor 32 is connected to the other end of said cross-arm by a pull spring 35.

An elastic system is thus provided which is supported by the rod 12. The arm 22 extends horizontally and is constrained in its vertical movement by the eye 24. The pointer 21 and the arm 28 also contribute some mass to the elastic system. The center of gravity of the entire suspended system is on a horizontal plane passing through the axes of the spindles 18, 26.

A novel feature of the instrument herein described resides in the fact that the helical spring 30 which supports the mass, or weight, 23 is essentially in a vertical position and is attached to said mass, or weight, at a point in a vertical plane parallel to the axis of the spindle 18 and passing through the center of gravity of the entire suspended system.

To achieve proper sensitivity the tension spring 30 is attached at a point such that a line from the point through the axis of the spindle 18 forms an angle of approximately forty-five degrees with the horizontal plane through said axis of the spindle 18. This arrangement reduces stress on the pivots 19, 19 and also the stress on the spring 30. As compared to other positions of a similar spring as used in other instruments of this type this position of the tension spring 30 relieves the elastic system of undesirably high stresses which result in inaccuracies of operation.

Means for nulling the instrument has been provided. This may be accomplished by moving the upper end of the tension spring 30 by means of the arm 29 so as to change the angle of the application of its force.

Force causing said adjusting or nulling motion of the arm 29 is applied by the springs 34, 35.

Heretofore temperature compensating systems for such instruments have been made and adjusted to correct for temperature changes in a limited range only, the correction becoming less accurate at both higher and lower temperatures. In this present invention the adjustable and controllable motion of the compensator arm 29 is obtained by a novel design by including a short extension spring 36 in one member 36b of the differential expansion structure. This spring is short and non-linear, its extension being disproportional to the force acting upon it.

Figure 3:
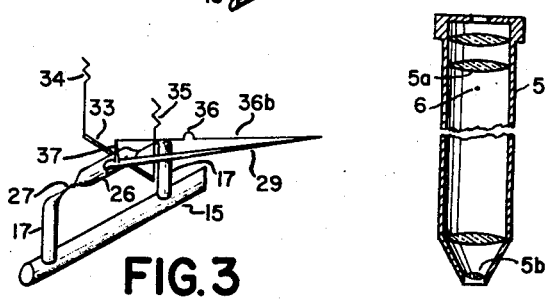
Figure 3 is an enlarged, perspective detail of the temperature compensator shown in Figure 1.
Figure 6:
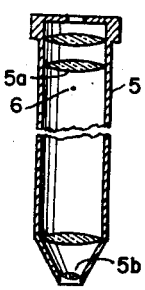
Figure 6 is an enlarged, sectional view of a microscope tube employed.

As best seen in Fig. 3, the temperature compensating structure consists of a pair of arms 29 and 36b joined at their extending ends and connected by a spacing arm 37 at their other ends. These arms are made of suitable materials having different coefficients of thermal expansion. It will be apparent to those skilled in the art that a change in temperature will cause the relative lengths of the arms to change thus creating a force tending to bend or move one or both of the arms 29 and 36b thereby moving the extending ends of the arms 29 and 36b generally in an arc about the spindle 26. In a preferred form the supporting spring 30 is connected directly to the extending ends of arms 29 and 36b, the above described movement of the compensating structure moving the end of the spring 30 to which it is connected in such a way as to effectively compensate for the effect of temperature variations on the system.

Such a structure can be adjusted to provide the necessary compensating movement through only a very limited temperature range, and beyond this range the compensating movement becomes too large or too small due to the inherent non-linearity of the system. This difficulty is overcome in the present invention by the addition of a short non-linear spring indicated by the reference numeral 36 to an arm of the temperature compensating structure. This spring 36 yields non-linearly to the force produced by the differential expansion in the connected arms 29 and 36b resulting in a controlled compensating movement of the extending end over a large temperature range. Those skilled in the art can adjust the non-linearity of spring 36 to provide the desired compensating movement.

It is understood that a non-linear spring 36 may be connected at any suitable part of the system and need not be attached directly to either of the compensating arms 29 or 36b.

Figure 4:
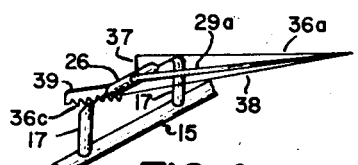
Figure 4 is another embodiment of the temperature compensator.

An alternative form is shown in Fig. 4 wherein a linear spring 36c is connected to the compensating structure through a spacing arm 39 secured to the spindle 26 and to the extending end of the arms 29a and 36a by an arm 38. It can be seen that the movement of the extending end of the temperature compensating structure due to deflections of arms 29a and 36b by temperature variations will result in a non-linear change of the moment about the spindle 26 exerted by the spring 36c on the extending end of the temperature compensating structure. Those skilled in the art can adjust the non-linearity of the change of moment to obtain the desired movement of the extending end of the arms 29a, 36a and 38. Thus, a linear spring may be used to provide the desired non-linear force to correct the compensating action of the temperature compensating structure. Other than these changes the temperature compensating structure illustrated in Fig. 4 is similar to that illustrated in Fig. 3.

By means of this adjusted labilizing action on the temperature compensating mechanism such as shown in Figure 3 or Figure 4 the motion imparted by the temperature compensation mechanism to the end of the spring 30 is that motion required for compensating the resultant effect of temperature changes on all parts of the system throughout a reasonably wide working range.

Attention is called to the fact that it is not necessary that the labilized compensator be connected directly or indirectly to the supporting spring 30 as indicated in the preferred design shown in Figure 1. The labilized compensator may act directly on the mass 23, thus changing its distance from the fulcrum and correspondingly changing its moment. It may also act upon the mass as an additional lifting force similar to, but independent of, the supporting spring.

Figure 5:
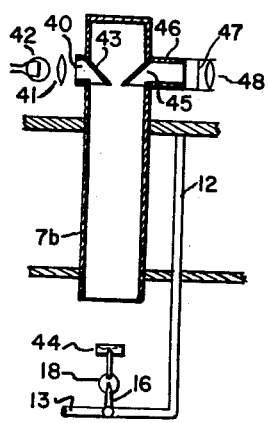
Figure 5 is an elevational view, partly in section, of another embodiment of the reading device.

In Figure 5 a modification is illustrated wherein the microscope tube 5 is not employed. A light tube 7b is extended downwardly through the top of the housing 1 and into the inner case 3 in vertical alignment over the spindle 18. The upper end of the light tube 7b is closed and is provided with a light inlet side opening 40. In front of this opening there is mounted a suitable lens 41 and a source of light 42. The rays of light from said source pass through the lens and through said opening and are deflected downwardly by the deflector 43 within the tube 7b.

Mounted on the spindle 18 there is an upwardly directed mirror 44 whose upper surface is preferably concave. The downwardly deflected rays of light are reflected by the mirror onto an inside deflector 45 and out through the tube 46 thus forming an image of the crosshair 47 on a suitable lens 48.

Fitted downwardly through the lid, or cover, of the outer housing there are the adjusting rods 49 and 50 whose lower ends are threaded through the top of the inner case 3 and bear against the respective flexible anchors 31 and 32. These anchors have sufficient flexibility to maintain the springs 34, 35 under a predetermined tension but this tension may be reduced in either spring by screwing the corresponding rod 49 or 50 downwardly to flex the corresponding anchor downwardly.

Figure 2:
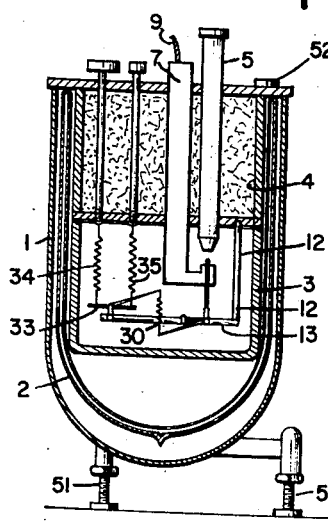
Figure 2 is a vertical, sectional view of the instrument of the type shown in Figure 1.

In use the instrument may be set at a selected location and brought to a level by properly adjusting the feet 51 on which the instrument is mounted. There are preferably three of these feet but only two are shown in Figure 2. When the instrument is brought to a level this will be indicated by a spirit level 52 on the instrument. The gravitational effect of the mass may move the pointer 21 so as to cast a shadow eccentric with respect to the crosshair 6. Thereupon the rod 49 may be turned to change the tension on the spring 34 and to bring the shadow cast by the pointer 21 into registration with the crosshair 6. On the head of the rod 49 there is a dial 53 and there is a co-operating upstanding pointer 54 on the top of the instrument whereby the gravitational force on the mass 23 may be registered. The instrument may then be moved to another location and the process repeated and the differences, if any, of the gravitational force of the two locations thus indicated. If the form of instrument illustrated in Figure 5 is employed the process will be much the same. Variations in gravitational force will vary the position of the mirror 44 which, in turn, will vary the indication of the crosshair 47 on the lens 48 and these variations may be registered by the turning of the dial 53 in the manner hereinabove indicated.

The drawings and description illustrate what is now considered to be preferred forms of the invention by way of illustration only while the broad principle of the invention will be defined by the appended claims.

What I claim is:

1. A gravity-measuring device comprising; an elastic system including a mass, a movable support, yieldable means suspending the mass from the support, and means for adjustably moving said support for restoring the mass to a null position; and a temperature-compensating structure comprising two generally parallel members of different thermal expansion joined at spaced points adjacent their ends, one of said members including means which imparts thereto a nonlinear resiliency along an axis connecting said spaced points whereby temperature variations effect a nonlinear relative lateral movement to said ends, one end of the temperature-compensating structure connected to the movable support and the other end linked to the yieldable means, the temperature-responsive lateral movement of the other end being adjusted in amplitude and linearity and having a component in the direction of action of the yieldable means for compensating for temperature variations.

2. A gravity-measuring device comprising; an elastic system including a mass, a movable support, yieldable means suspending the mass from the support, and means for adjustably moving said support for restoring the mass to a null position; and a temperature-compensating structure comprising two generally parallel members of different thermal expansion joined at spaced points adjacent their ends, one of said members including means which imparts thereto a nonlinear resiliency along an axis connecting said spaced points whereby temperature variations effect a nonlinear relative lateral movement to said ends, one end of the temperature-compensating structure connected to the movable support and the other end linked to the mass, the temperature-responsive lateral movement of the other end being adjusted in amplitude and linearity and having a component in the direction of action of the yieldable means for compensating for temperature variations.

3. A gravity-measuring device comprising; an elastic system including a mass, a fixed support, yieldable means suspending the mass, and means linked to the yieldable means for adjustably moving the yieldable means for restoring the mass to a null position; and a temperature-compensating structure comprising two generally parallel members of different thermal expansion joined at spaced points adjacent their ends, one of said members including means which imparts thereto a nonlinear resiliency along an axis connecting said spaced points whereby temperature-variations effect a nonlinear relative lateral movement to said ends, one end of the temperature-compensating structure connected to the fixed support and the other end linked to the yieldable means, the temperature-responsive lateral movement of the other end being adjusted in amplitude and linearity and having a component in the direction of action of the yieldable means for compensating for temperature variations.

4. A gravity-measuring device comprising; an elastic system including a mass, a fixed support, yieldable means suspending the mass, and means linked to the yieldable means for adjustably moving the yieldable means for restoring the mass to a null position; and a temperature-compensating structure comprising two generally parallel members of different thermal expansion joined at spaced points adjacent their ends, one of said members including means which imparts thereto a nonlinear resiliency along an axis connecting said spaced points whereby temperature variations effect a nonlinear relative lateral movement to said ends, one end of said temperature-compensating structure connected to the fixed support and the other end linked to the mass, the temperature-responsive lateral movement of the other end being adjusted in amplitude and linearity and having a component in the direction of action of the yieldable means for compensating for temperature variations.

5. A gravity-measuring device comprising, a mass, a support rotatable about its longitudinal axis, a spring suspending the mass from the support, adjustment screws for adjustably moving said support for restoring the mass to a null position, and a temperature-compensating structure comprising two generally parallel members of different thermal expansion joined at spaced points adjacent their ends, one of said members including a nonlinear spring which imparts thereto a nonlinear resiliency along an axis connecting said spaced points whereby temperature variations effect a nonlinear relative lateral movement to said ends, one of said ends connected to the movable support and the other end connected to and supporting the spring, the temperature-responsive lateral movement of the other end being adjusted in amplitude and linearity and having a component in the direction of action of the spring for compensating for temperature variations.

6. A gravity-measuring instrument comprising, an elastic system including a mass, a support rotatable about its longitudinal axis, an elastic member resiliently supporting the mass from the support, the elastic member being a zero-length helical spring, and means for adjustably moving the support for restoring the mass to a null position, and a temperature-compensating structure comprising two generally parallel members of different thermal expansion joined at spaced points adjacent their ends, one of said members including means which imparts thereto a nonlinear resiliency along an axis connecting said spaced points whereby temperature variations effect a nonlinear relative lateral movement to said ends, one end of the temperature-compensating structure connected to the movable support and the other end attached to and supporting the zero-length helical spring, the points of attachment of the spring to the temperature-compensating structure and to the mass being substantially in a vertical plane, the temperature-responsive lateral movement of the other end being adjusted in amplitude and linearity and having a component in the direc-tion of action of the zero-length helical spring for compensating for temperature variations.

7. A gravity-measuring device comprising, a mass, a spring supporting said mass, a spindle rotatable about a horizontal axis, a first resilient beam extending radially from the spindle, said spring having its upper end attached to and supported by the extending end of said beam, means for adjustably rotating the spindle for restoring the mass to a null position, and a second beam of different thermal expansion from said first beam and joined to the said first beam at spaced points adjacent their ends, said first and second beams being disposed in generally parallel relation, said second beam including means which imparts to said first and second beams a nonlinear resiliency along an axis connecting said spaced points whereby temperature variations effect a nonlinear relative lateral movement to said ends, said temperature-responsive movement being adjusted in amplitude and linearity and having a component in the direction of action of the spring for compensating for temperature variations.

8. In a gravity-measuring device, an elastic system comprising, a first spindle rotatable about a horizontal axis, a first arm extending upwardly from said first spindle at an angle of about forty-five degrees to a horizontal plane passing through the axis of said first spindle, a second spindle rotatable about a horizontal axis, a second arm extending downwardly from said second spindle and towards said first arm and at an angle of about forty-five degrees to a horizontal plane passing through the axis of the second spindle, such first and second arms being in the same vertical plane and having their extending ends in substantially vertical alignment, a spring in an approximately vertical position whose upper and lower ends are connected to the extending ends of said arms, a weight member adapted to respond to the force to be measured, a third arm connecting the weight member to the second spindle, and means connected to the first spindle for adjustably rotating the first spindle for restoring the weight member to a null position.

9. The gravity-measuring device of claim 8 where the first arm is resilient and which includes a fourth arm of different thermal expansion from the first arm connected in generally parallel relation at spaced points to the first arm adjacent their ends, one of said first or fourth arms including means which imparts thereto a nonlinear resiliency along an axis connecting said spaced points whereby temperature variations effect a nonlinear relative lateral movement to the said first and fourth arms, said temperature-responsive lateral movement being adjusted in amplitude and linearity and having a component in the direction of action of the spring for compensating for temperature variations.

10. A gravity-measuring device comprising; an elastic system including a mass, a spindle rotatable about a horizontal axis, yieldable means suspending the mass from the spindle, second yieldably means connected to said spindle for adjustably rotating the spindle for restoring the mass to a null position; and a temperature-compensating structure comprising a resilient arm extending radially from the spindle and connected to an upper end of and supporting the yieldable means, a nonlinear spring connected at spaced points to and adjacent the ends of the resilient arm, said arm and spring being disposed in generally parallel relation and being of different thermal expansion, said nonlinear spring imparting to the resilient arm a nonlinear resiliency along an axis connecting said spaced points whereby temperature variations effect a nonlinear relative lateral movement to said ends, the temperature-responsive lateral movement of the ends being adjusted in amplitude and linearity and having a component in the direction of action of the yieldable means for compensating for temperature variations.

11. A measuring device comprising, a mass, a movable support, yieldable means suspending the mass from the support, and means for adjustably moving said support for restoring the mass to a null position, and a temperature-compensating structure comprising a resilient arm extending radially from the movable support and joined at its extending end to and supporting the yieldable means, and a nonlinear spring joined at spaced points to and adjacent the ends of the arm, said arm and spring being disposed in generally parallel relationship and being of different thermal expansion, said nonlinear spring imparting to the temperature-compensating structure a nonlinear resiliency along an axis connecting said spaced points whereby temperature variations effect a nonlinear lateral movement to said ends, the temperature-responsive lateral movement of the extending end being adjusted in amplitude and linearity and having a component in the direction of action of the yieldable means for compensating for temperature variations.

12. A measuring device comprising, a mass, a movable support, yieldable means suspending the mass from the support, and means for adjustably moving the support for restoring the mass to a null position, and a temperature-compensating structure comprising a first arm extending radially from the movable support and joined at its extending end and supporting the yieldable element, a second arm joined at spaced points to said first arm adjacent their ends, and a third arm having a linear spring joined at spaced points to said first arm adjacent their ends, such arms being of different thermal expansion and being disposed in generally parallel relation, said linear spring imparting a nonlinear resiliency along an axis connecting the spaced points of said arms whereby temperature variations effect a nonlinear relative lateral movement of said ends, the temperature-responsive lateral movement of the extending end of the first arm being adjusted in amplitude and linearity and having a component in the direction of action of the yieldable means for compensating for temperature variations.

References Cited in the file of this patent

UNITED STATES PATENTS

| Number | Name | Date |
|---|---|---|
| 1,639,365 | Brown | Aug. 16, 1927 |
| 1,998,345 | Truman | Apr. 16, 1935 |
| 2,279,261 | Crawford et al. | Apr. 7, 1942 |
| 2,357,356 | Petty | Sept. 5, 1944 |
| 2,367,126 | James | Jan. 9, 1945 |
| 2,383,997 | Sweet | Sept. 4, 1945 |